Figure 1:
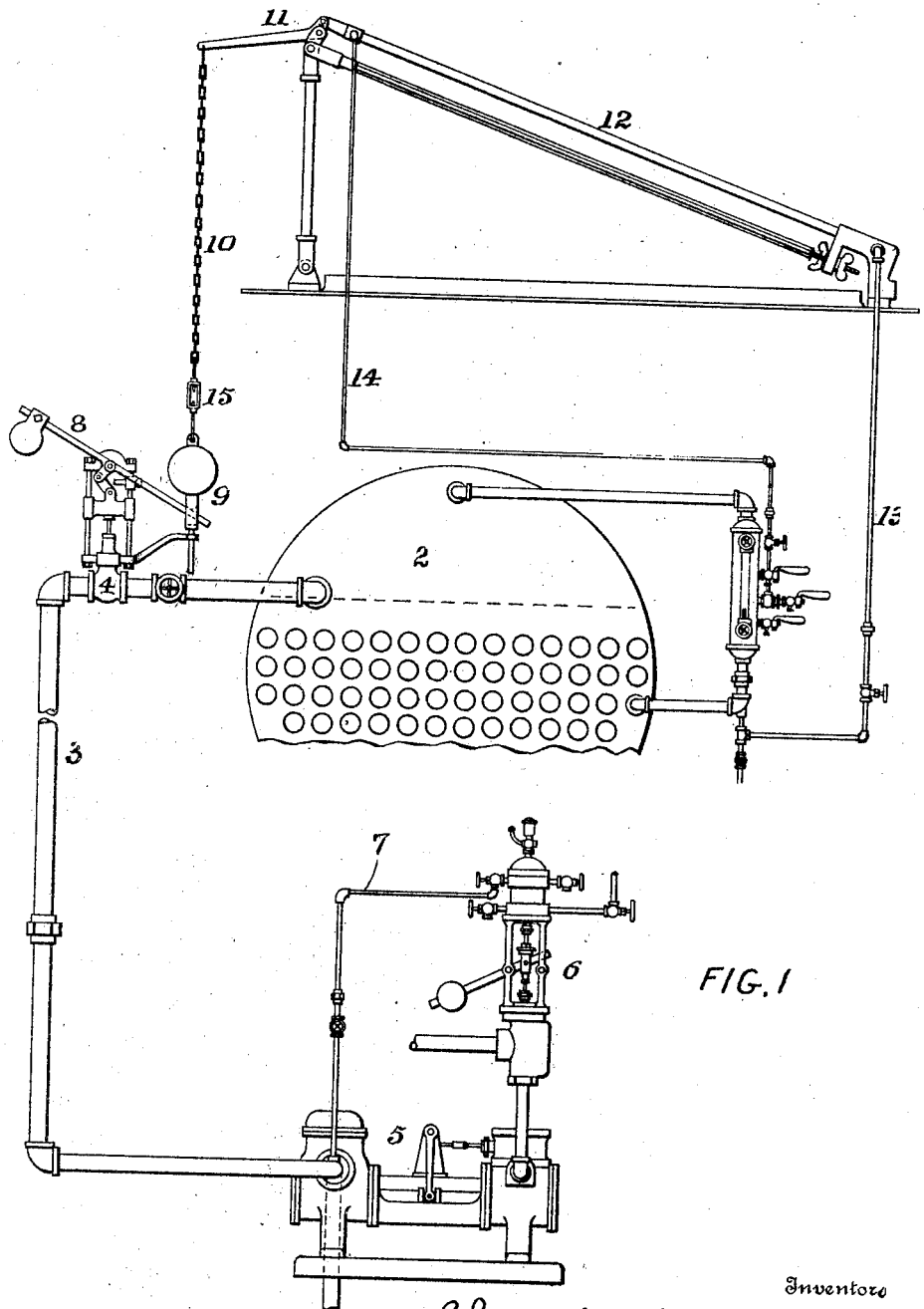

C. M. CLARK & G. H. GIBSON.
BOILER FEED WATER REGULATOR.
APPLICATION FILED JUNE 17, 1909.
1,005,156.
Patented Oct. 10, 1911.
2 SHEETS—SHEET 2.
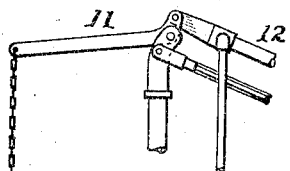
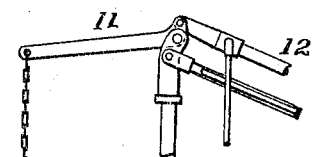
FIG. 2
FIG. 3
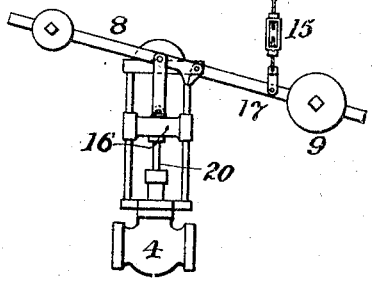
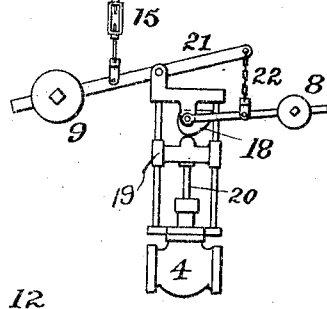
FIG. 4
FIG. 5
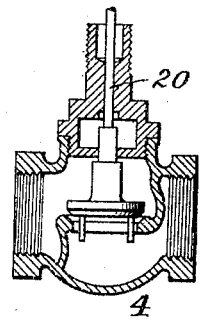
FIG. 7
FIG. 6
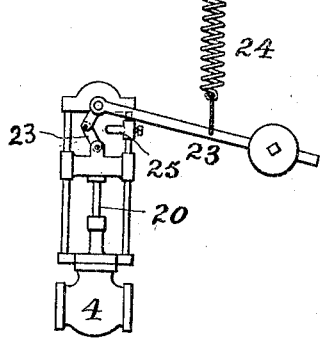
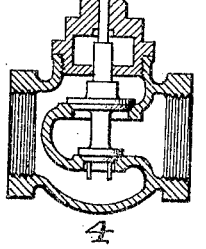
Witnesses
Daniel Webster, Jr.
P. M. Kelly.
Inventors
Charles Motley Clark,
George H. Gibson
By
Attorney

UNITED STATES PATENT OFFICE.

CHARLES MOTLEY CLARK, OF CHICAGO, ILLINOIS, AND GEORGE H. GIBSON, OF UPPER MONTCLAIR, NEW JERSEY; SAID GIBSON ASSIGNOR TO SAID CLARK.

BOILER FEED-WATER REGULATOR.

1,005,156.  Specification of Letters Patent.  Patented Oct. 10, 1911.

Application filed June 17, 1909. Serial No. 502,654.

*To all whom it may concern:*

Be it known that we, CHARLES MOTLEY CLARK, a citizen of the United States, and a resident of the city of Chicago, county of Cook, and State of Illinois, and GEORGE H. GIBSON, a citizen of the United States, and a resident of Upper Montclair, Essex county, and State of New Jersey, have invented an Improvement in Boiler Feed-Water Regulators, of which the following is a specification.

Our invention has reference to boiler feed water regulators and consists of certain improvements which are fully set forth in the following specification and shown in the accompanying drawings which form a part thereof.

Heretofore, boiler feed water regulators have been employed in which a supply valve in the boiler feed pipe has been controlled by a thermostatic regulator in which the power to operate the valve has been produced by the expansion of the thermostatic member of the regulator, but great difficulty has been experienced, owing to the fact that the expansible member was required to be of considerable length to secure a sufficient amount of expansion for mechanically operating the valve, and this great length which is necessary, has made the expansible member (usually in the form of a tube) liable to buckle or bend and which danger has necessitated very careful proportioning of the resistances to be overcome to insure perfect and continuous operation in the apparatus.

The object of our invention is to overcome the above stated difficulties in the operation of a thermostatic regulator for boiler feed purposes by eliminating the necessity of relying upon the expansion of the thermostatic member for directly operating the valve or valve controlling means for permitting water to be fed to the boiler, and instead to employ the contraction of the expansible member for this purpose whereby an expansible member of small cross section may be employed without the necessity of special proportioning of the resistances to be overcome and with absolute assurance of continued operation in the most perfect manner. By thus employing the contraction of the thermostatic member for the purposes of securing the operative power, it is evident that a small cross section of tube may be employed and obtain sufficient strength for the purpose, and this employment of a small cross section provides relatively a greater radiating surface than where the cross section is of greater area with the result that the thermostatic member is more sensitive of variations in temperature and more quick in response to variable conditions under which it is required to operate.

Our invention consists of a normally closed valve device combined with a thermostatic or expansible member which is caused to expand when the water in the boiler is below the normal level and contract when the water in the boiler is at or above the normal level, and connecting means between the thermostatic member and the valve device whereby the valve device is permitted to close when the thermostatic member contracts and vice versa.

More specifically our invention consists of a boiler, a feed water pipe and a valve device therein, combined with a thermostatic device which is expanded and contracted under varying conditions of water level in the boiler and connecting means between the thermostatic device and the valve for holding the valve closed when the thermostatic device is under contraction, and releasing the valve whereby it may freely open when the thermostatic device is under expansion.

Our invention also comprehends details of construction, which, together with the features above specified will be better understood by reference to the drawings, in which:

Figure 1 is a diagrammatic elevation of our improved feed water apparatus in the act of feeding water; Figs. 2, 3, and 4 diagrammatically illustrate modified means for operating the check valve and Figs. 5, 6, and 7 are sectional elevations of different types of check valves which may be employed in connection with our invention.

2 is the boiler, 3 is the feed water pipe, 4 is the check valve therein and 5 is the feed water pump. This feed water pump is provided with a pump governor 6 of any suitable construction which is operated to stop the pump when the pressure of the water in the feed water pipe between the valve 4 and pump exceeds the boiler pressure by a predetermined amount, usually about ten pounds. This action is secured in the usual way by operating the pump governor to stop the pump by the pressure from said portion of the feed water pipe through a pipe 7. In this manner the pump is required to operate only when the water is passing to the boiler.

The check valve 4 is normally closed upon its seat and may be held closed against the greater pressure from the pump side of the valve by a weighted lever 8 which acts as a mechanical device to hold the valve closed. When this lever is free and exerting its power the pump governor is caused to come into action to stop the pump.

9 is a second weighted device and may be employed as a counterbalance to remove the action of the weighted lever 8 from the valve and thereby permit the valve to open by reason of the greater pump pressure overcoming the boiler pressure. When this is done, the pressure in the pump governor falls and the pump is automatically started into operation.

The weighted device 9 is operated by a thermostatic device by means of a bell crank 11 and a chain 10 which may be provided with an adjusting turn buckle for regulating its time of action in lifting or lowering the device 9. The thermostatic device is provided with an expansible tube member 12 having its end at different levels and its top connected by pipe 14 with the boiler at the normal water level and its bottom connected by pipe 13 with the water space of the boiler much below the normal water level. It will now be seen that, should the water level in the boiler fall below the normal level, the water in the expansion tube 12 would drain out and the steam would enter and cause the expansion tube to expand. This action would lower the overbalancing weight device 9 and remove the action of the weighted lever 8 from the check valve 4. The pump presssure of the water now forces up the check valve and lowers the said pump pressure with the result that the pump governor 6 puts the pump into action and forces the water through the check valve into the boiler. When the water level in the boiler reaches the normal level, the lower end of the pipe 14 is sealed and then the steam in the expansible member 12 condenses and radiation causes said member to contract. The contraction of the expansible member 12 rocks the lever 11 and lifts the weight 9 from the weighted lever 8, allowing it to oscillate under its own weight and apply pressure to close the check valve tightly upon its seat against the pressure of the pump. The pump pressure then rises and the pump governor is operated to stop the operation of the pump. This condition is maintained until the water level in the boiler again gets below the normal level.

Referring now to Fig. 2 the weighted lever 8 is made to operate upon the valve by a link connection with a cross head 16 having the stem 20 which normally closes the valve upon its seat. The lever 8 is operated by gravity to close the valve and is lifted by a weighted lever 19 when the valve is to be released. In this case, the overbalancing weight 9 is on a lever 17 which has a short arm acting upon the lever 8 to lift it and remove the pressure from the valve.

In the case of Fig. 3, the weighted lever 8 operates by a cam 18 upon the cross head 19 to force down a rod 20 which depresses the check valve upon its seat. The overbalancing weight 9 is secured to a lever 21 and this is in turn linked at 22 with the weighted cam lever 8 and thereby puts it into or out of operation.

In the construction shown in Fig. 4 the rod 20 is operated by the short arm of a heavily weighted lever 23 through a link 22, the rod 20 being intended to operate upon the check valve as in the case of Fig. 1. The lever 23 is connected to the chain 10 through a heavy spring 24. In this case the contraction of the expansible member 12 lifts the chain and with it the lever 23 to close the valve. The spring 24 allows for any continued expansion of the tube 12 and oscillation of crank lever 11 after the check valve is closed. The stop 25 limits the movement of the lever 23. Any other means to compensate for the extra expansion over what is necessary to close the valve may be employed in lieu of the spring 24, if so desired.

The check valve 4 may be made of any suitable form, for example, as shown in either of Figs. 5, 6 or 7. In Fig. 5 an ordinary form of check valve is shown with the operating rod or plunger 20 disconnected from the valve piece which it operates. In Fig. 6 the valve is shown as double seated and balanced. In Fig. 7 the valve is shown as double seated but only partly balanced. Any other form of valve suitable for the purpose may be employed.

The details of construction may be modified without departing from the spirit of the invention.

Having now described our invention what we claim as new and desire to secure by Letters Patent, is:—

1. In a boiler feed regulator, the combination of a boiler, a feed water pipe, an unbalanced valve in the feed water pipe to control the supply of water to the boiler, mechanical means independent of the boiler pressure for normally holding the valve closed against the supply of pressure to prevent the supply of water to the boiler, an expansible member which is expanded and contracted under variations in the level of the water in the boiler, and connecting means between the expansible member and the mechanical means constantly maintaining the expansible member under tension and for removing the action of the mechanical means from the valve when the expansible member expands, and vice versa.

2. In a boiler feed regulator, the combination of a boiler, a feed water pipe, an unbalanced valve in the feed water pipe to control the supply of water to the boiler, mechanical means for permitting the valve to open to prevent the supply of water to the boiler, an expansible member which is expanded and contracted under variations in the level of the water in the boiler consisting of a tube fixedly supported at one end and with its ends at different elevations and having a pipe connecting the upper end of the tube with the boiler at the normal water level and a pipe connecting the lower end of the expansible tube with the water space of the boiler below normal water level, and connecting means extending from the free end of the expansible tube for normally maintaining it under tension and removing the action of the mechanical means from the valve when the expansible member expands, and vice versa.

3. In a boiler feed regulator, a boiler, a feed water pipe, a valve in the feed water pipe to control the supply of water to the boiler, mechanical means for holding the valve closed to prevent the supply of water to the boiler consisting of a weighted lever to hold the valve shut, an overbalancing weighted device for operating the weighted lever to remove its action upon the valve and permit it to open, in combination with a thermostatic member which is expanded and contracted under variations in the level of the water in the boiler, and a connection between the overbalancing weighted device and the thermostatic member whereby its action is removed from the weighted lever when the thermostatic member contracts and vice versa.

4. In a thermostatic regulator, the combination of a boiler, a feed water pipe, a check valve in said feed water pipe, mechanical means for normally holding the check valve to its seat, overbalancing means acting by gravity for removing the action of the mechanical power devices upon the valve to permit the valve to open to supply feed water to the boiler, a thermostatic member adapted to expand when the water is low in the boiler and contract when the water is at the normal level therein said member being held under tension, and connecting means between the thermostatic member and the overbalancing power devices whereby said power devices are thrown out of action when the thermostatic member is under expansion and the overbalancing means puts the thermostatic member under tension.

5. In a thermostatic regulator, the combination of a boiler, a feed water pipe, a weighted lever means for holding the valve tight upon its seat, a weighted device for removing the pressure of the lever means from the valve to permit the valve to open, a thermostatic member which is connected with the boiler so as to expand when the water is below the normal level and to contract when the water is at or above the normal level, and connecting means between the thermostatic member and the weighted device whereby the action of the same is removed from the lever means when the thermostatic member is under contraction.

6. In a thermostatic regulator, the combination of a boiler, a feed water pipe, a weighted lever means for holding the valve tight upon its seat, a weighted device for removing the pressure of the lever means from the valve to permit the valve to open, a thermostatic member which is connected with the boiler so as to expand when the water is below the normal level and to contract when the water is at or above the normal level, and connecting means between the thermostatic member and the weighted device consisting of a lever operated by the thermostatic member and a flexible connection between the lever and the weighted device whereby the action of the same is removed from the lever means when the thermostatic member is under contraction.

7. In a feed water regulator, the combination of a boiler, a feed water pipe therefor, a valve in said feed water pipe to control the supply of water to the boiler, and a thermostatic controlling means, power means for holding the valve closed upon its seat when the said thermostatic means is contracted, and devices for overpowering the power means for releasing the valve to permit it to open when the said means is expanded as when the level of the water in the boiler is below the normal level, said devices permitting the contraction of the thermostatic means after the valve is closed without disturbing it.

8. In a feed water regulator, the combination of a boiler, a feed water pipe therefor, a valve to control the supply of water to the feed water pipe, a thermostatic means, power means for holding the valve closed upon its seat when the said thermostatic means is contracted, devices for overpowering the power means for releasing the valve to permit it to open when said thermostatic means is expanded as when the level of the water in the boiler is below the normal level, said devices permitting the contraction of the thermostatic means after the valve is closed without disturbing it, and means for supplying feed water to the feed water pipe at a constantly acting greater pressure than than that in the boiler and at a less pressure than is capable of opening the valve when the thermostatic means are under contraction.

In testimony of which invention, we hereunto set our hands.

CHARLES MOTLEY CLARK.
GEORGE H. GIBSON.

Witnesses:
 ROBERT G. CLIFTON,
 W. ATWOOD MEHARG.